United States Patent
Imai et al.

(10) Patent No.: US 7,090,063 B2
(45) Date of Patent: Aug. 15, 2006

(54) ELECTROMAGNETIC CLUTCH

(75) Inventors: Yuichi Imai, Saitama (JP); Kuniaki Shimizu, Saitama (JP); Takashi Watanabe, Saitama (JP); Daisuke Asakura, Saitama (JP)

(73) Assignee: Valeo Thermal Systems Japan Corporation, Saitama (JP)

( * ) Notice: Subject to any disclaimer, the term of this patent is extended or adjusted under 35 U.S.C. 154(b) by 62 days.

(21) Appl. No.: 10/504,224

(22) PCT Filed: Dec. 18, 2002

(86) PCT No.: PCT/JP02/13210

§ 371 (c)(1),
(2), (4) Date: Aug. 11, 2004

(87) PCT Pub. No.: WO03/069178

PCT Pub. Date: Aug. 21, 2003

(65) Prior Publication Data

US 2005/0139446 A1 Jun. 30, 2005

(30) Foreign Application Priority Data

Feb. 12, 2002 (JP) ............................. 2002-034133

(51) Int. Cl.
*F16D 27/112* (2006.01)
(52) U.S. Cl. ..................... 192/84.941; 192/84.961; 192/209
(58) Field of Classification Search ............ 192/84.941
See application file for complete search history.

(56) References Cited

U.S. PATENT DOCUMENTS

| 4,432,446 A | * | 2/1984 | Okano et al. | 192/84.961 |
| 4,828,090 A | * | 5/1989 | Matsushita | 192/84.941 |
| 6,138,809 A | * | 10/2000 | Kinoshita et al. | 192/84.961 |
| 6,244,408 B1 | * | 6/2001 | Tobayama et al. | 192/84.961 |
| 6,616,671 B1 | | 9/2003 | Hayashi et al. | |

FOREIGN PATENT DOCUMENTS

| JP | 50-051048 U | | 5/1975 |
| JP | 62046029 A | * | 2/1987 |
| JP | 63-129722 U | | 8/1988 |
| JP | 02-002537 U | | 1/1990 |
| JP | 03-044234 U | | 4/1991 |
| JP | 05133426 A | * | 5/1993 |
| JP | 07-071483 A | | 3/1995 |
| JP | 2000-027895 A | | 1/2000 |
| JP | 2000-283182 A | | 10/2000 |

* cited by examiner

*Primary Examiner*—Richard M. Lorence
(74) *Attorney, Agent, or Firm*—Rader, Fishman & Grauer PLLC

(57) ABSTRACT

An electromagnetic clutch capable of reducing attracting noise generated when an armature plate is attracted to the friction surface of a rotor, wherein the thickness of the projected part (32) of an elastic member (31) in the state of being compressingly held by an inner plate (26) and the armature plate (12) is increased more than the thickness of the projected part (33) of the elastic member (31) in the state of being compressively held by an outer plate (17) and the armature plate (12), whereby the volume of the projected part (32) of the elastic member (31) can be increased relative to that of the projected part (33).

6 Claims, 5 Drawing Sheets

ELECTROMAGNETIC CLUTCH

TECHNICAL FIELD

The present invention relates to an improvement to be made on the structure of an electromagnetic clutch which is utilized to intermittently supply rotating motive power from a motive power source such as an engine to a slave device such as a compressor.

BACKGROUND ART

Electromagnetic clutches in the known art include the electromagnetic clutch disclosed in Japanese Unexamined Utility Model Publication No. H 2-2537. This electromagnetic clutch includes a hub having a flange and connected to a rotating shaft, an inner plate fixed onto the flange, an armature plate which is attracted to a rotor member so as to rotate together with the rotor member when a field coil is excited, an outer plate fixed onto the armature plate so as to constitute a part thereof and an annular rubber cushion member disposed between the inner plate and the outer plate and fixed onto the two plates.

To describe the electromagnetic clutch in further detail in reference to the drawings and the like included in the publication, the hub and the inner plate constituted as separate elements from each other are connected via a rivet. In addition, the surfaces of the outer plate and the inner plate facing toward the armature plate are aligned along the radial direction. While the portion of the surface of the rubber member facing toward the armature plate, which is on the outer plate side, is not in contact with the armature plate, the portion of the surface of the rubber member on the inner plate side facing toward the armature plate includes a projected part made to project further outward along the axial direction relative to the portion on the outer plate side and the projected part is in contact with the armature plate. The gap between the inner plate and the armature plate is eliminated by inserting a washer at the rivet having a measurement along the axial direction substantially equal to the measurement by which the projected part of the rubber cushion member on the inner plate side is made to project out and then by firmly holding the washer between the armature plate and the outer plate when locking the armature plate to the outer plate with the rivet.

The extent of the engagement noise that occurs when the armature plate is attracted to and contacts the rotor in an electromagnetic clutch needs to be minimized. Such engagement noise may be reduced by increasing the volume of the portion of the rubber cushion member on the inner plate side. However, if the volume is increased in the structure adopted in the electromagnetic clutch disclosed in the publication quoted above by, for instance, increasing the thickness of the rubber cushion member on the actuator side, the distance between the outer plate and the armature plate is bound to become more significant, which necessitates a larger number of washers to fill the gap and leads to a problem in that the electromagnetic clutch itself and ultimately the slave device such as a compressor cannot be provided as compact units.

In addition, while the extent of the engagement noise is likely to be reduced by fixing the portion of the rubber cushion member on the outer plate side in a compressed state onto the armature plate, the portion of the rubber cushion member on the outer plate side is not in contact with the armature plate in the electromagnetic clutch disclosed in the publication and thus, the structure achieved by fixing the rubber cushion member on the outer plate side in the compressed state onto the armature plate cannot be adopted in the electromagnetic clutch in the publication.

In order to lower the production cost of on-vehicle air-conditioning systems, electromagnetic clutches need to be manufactured at lower cost, which necessitates the functions of the various parts of the electromagnetic clutches to be scrutinized thoroughly to eliminate any nonessential parts.

Furthermore, the epoxy coating that is sprayed over the entire rubber cushion member to prevent corrosion normally coats the surface of the projected part of the rubber cushion member that comes in contact with the armature plate. In addition, a cationic coating is normally applied to the armature plate for rust prevention. If the epoxy coating is left on the contact surface of the projected part of the rubber cushion member which comes in contact with the armature plate, the projected part of the rubber cushion member becomes stuck to the surface of the armature plate coated with the cationic paint particularly under high-temperature, which may prevent the armature plate from becoming attracted to the rotor.

Accordingly, an object of the present invention is to provide an electromagnetic clutch with which the extent of the engagement noise occurring when the armature plate is attracted to the rotor is reduced, the number of required parts can be reduced and the armature plate can be attracted to the rotor with a higher degree of reliability.

DISCLOSURE OF THE INVENTION

The present invention provides an electromagnetic clutch comprising an exciting coil, a rotor that is rotationally driven by a motive power source, an armature plate facing opposite the rotor along the axial direction, which is attracted to the rotor by an electromagnetic force generated as power is supplied to the exciting coil, a hub having an axial center matching the axial center of the armature plate, an outer plate connected to the armature plate, an inner plate connected to the hub and an elastic member held at an annular gap formed as the outer plate and the inner plate are assembled together and bonded onto both the outer plate and the inner plate, characterized in that a portion of the elastic member on the inner plate side includes a projected part made to project outward along the axial direction so as to achieve contact with the armature plate when no power is supplied, that holding portions of the outer plate and the inner plate used to hold the elastic member face opposite each other over the annular gap and that the measurement of the holding portion at the outer plate taken along the axial direction is greater compared to the measurement of the holding portion at the inner plate taken along the axial direction.

When the electromagnetic clutch adopting the structure described above is in an assembled state, the surface of the inner plate facing toward the armature plate is set further away from the armature plate than the surface of the outer plate facing toward the armature plate. Thus, the projected part formed at the portion of the elastic member on the inner plate side is allowed to take on a greater measurement than that in a structure in which the surface of the inner plate facing toward the armature plate and the surface of the outer plate facing toward the armature plate are aligned each other along the radial direction in an assembled state. This, in turn, makes it possible to increase the volume of the projected part at the elastic member.

The present invention also provides an electromagnetic clutch comprising an exciting coil, a rotor that is rotationally driven by a motive power source, an armature plate facing opposite the rotor along the axial direction, which is attracted to the rotor by an electromagnetic force generated as power is supplied to the exciting coil, a hub having an axial center matching the axial center of the armature plate, an outer plate connected to the armature plate, an inner plate connected to the hub and an elastic member held at an annular gap formed as the outer plate and the inner plate are assembled together and bonded onto both the outer plate and the inner plate, characterized in that a portion of the elastic member on the inner plate side includes a first projected part made to project outward along the axial direction so as to achieve contact with the armature plate when no power is supplied, that a portion of the elastic member on the outer plate side includes a second projected part which is made to project outward along the axial direction so as to achieve contact with the armature plate and is also made to distend outward along the radial direction so as to be held between the armature plate and the outer plate and that the thickness of the first projected part when it is held between the inner plate and the armature plate is greater than the thickness of the second projected part when it is held between the outer plate and the armature plate.

In the electromagnetic clutch adopting the structure described above, a greater thickness achieved at the first projected part of the elastic member held between the inner plate and the armature plate increases the volume of the first projected part compared to that in an elastic member in the related art with the first projected part held between the inner plate and the armature plate and the second projected part held between the outer plate and the armature plate having thicknesses equal to each other.

As an alternative, the present invention provides an electromagnetic clutch comprising an exciting coil, a rotor that is rotationally driven by a motive power source, an armature plate facing opposite the rotor along the axial direction, which is attracted to the rotor by an electromagnetic force generated as power is supplied to the exciting coil, a hub having an axial center matching the axial center of the armature plate, an outer plate connected to the armature plate, and inner plate connected to the hub and an elastic member held at an annular gap formed as the outer plate and the inner plate are assembled together and bonded onto both the outer plate and the inner plate, characterized in that a portion of the elastic member on the inner plate side includes a first projected part made to project outward along the axial direction so as to achieve contact with the armature plate when no power is supplied, that a portion of the elastic member on the outer plate side includes a second projected part which is made to project outward along the axial direction so as to achieve contact with the armature plate and is also made to distend outward along the radial direction so as to be held between the armature plate and the outer plate and that the thickness of the first projected part in an uncompressed state is greater than the thickness of the second projected part in an uncompressed state. The elastic member in this electromagnetic clutch can be compressed until the armature contact surface of the portion of the elastic member on the inner plate side at least becomes aligned along the radial direction to the surface of the elastic member facing toward the armature on the outer plate side.

By adopting the structure described above in the elastic member of the electromagnetic clutch, the first projected part, which is allowed to have a greater thickness, achieves a greater volume relative to the first projected part in an elastic member in the related art with the first projected part and the second projected part having thicknesses equal to each other in an uncompressed state.

In this electromagnetic clutch, the outer plate includes a passing hole at which a member used to fasten the outer plate to the armature plate is inserted and a projected part projected from the outer edge of the passing hole toward the armature plate.

The structure described above, which is adopted in the outer plate, precludes the need to dispose a spacer member such as a washer between the armature plate and the outer plate in order to eliminate the gap formed between them due to the difference between the thickness of the first rejected portion and the thickness of the second projected part at the elastic member.

Moreover, the measurement by which the projected part at the outer plate is made to project out is set smaller than the measurement by which the second projected part of the elastic member is made to project out. The elastic member can be compressed until both the surface of the first projected part facing toward the armature plate and the surface of the second projected part facing toward the armature plate are aligned to the top surface of the projected part at the outer plate along the radial direction.

In the electromagnetic clutch adopting the structure described above, in which the measurement of the projected part of the outer plate is smaller than the measurement of the second projected part at the elastic member, the second projected part enters a compressed state when the outer plate and the armature plate become connected with each other via the second projected part and thus, the extent of the engagement noise occurring when the armature plate is attracted to the rotor can be lowered compared to the extent of the engagement noise occurring in a structure having the second projected member of the elastic member in an uncompressed state held between the outer plate and the armature plate.

As a further alternative, the present invention provides an electromagnetic clutch comprising an exciting coil, a rotor that is rotationally driven by a motive power source, an armature plate facing opposite the rotor along the axial direction, which is attracted to the rotor by an electromagnetic force generated as power is supplied to the exciting coil, a hub having an axial center matching the axial center of the armature plate, an outer plate connected to the armature plate, an inner plate connected to the hub and an elastic member held at an annular gap formed as the outer plate and the inner plate are assembled together and bonded onto both the outer plate and the inner plate, characterized in that a surface of the armature plate that is subjected to friction against the rotor is galvanized.

By adopting the structure described above in the armature plate in the electromagnetic clutch, the transfer torque in the initial stationary state is improved compared to that in a structure with a non-galvanized armature plate and, as a result, the extent of the engagement noise occurring as the armature plate becomes attracted to the rotor is reduced.

The armature plate and the outer plate may instead be connected with each other by forming a projected part at the armature plate so as to project outward along the axial direction and fitting the projected part at a passing hole at the outer plate. In such an electromagnetic clutch, the armature plate and the outer plate can be coupled without having to use any fastening member such as a rivet.

The hub and the inner plate may be connected with each other by forming a projected part at the hub so as to project outward along the axial direction and fitting the projected part at a passing hole at the inner plate. In this electromagnetic clutch, the hub and the inner plate can be coupled without having to use any fastening member such as a rivet.

The electromagnetic clutch is also characterized in that no coating is applied to the surface of the first projected part at the elastic member which achieves contact with the armature plate when no power is supplied. By adopting this structure in the elastic member of the electromagnetic clutch, the first projected part does not become stuck onto the surface of the armature plate facing toward the elastic member having a cationic coating applied thereto even when power is being supplied, and thus, the armature plate is allowed to be attracted to and held onto the rotor with a high degree of reliability.

Figure 1:
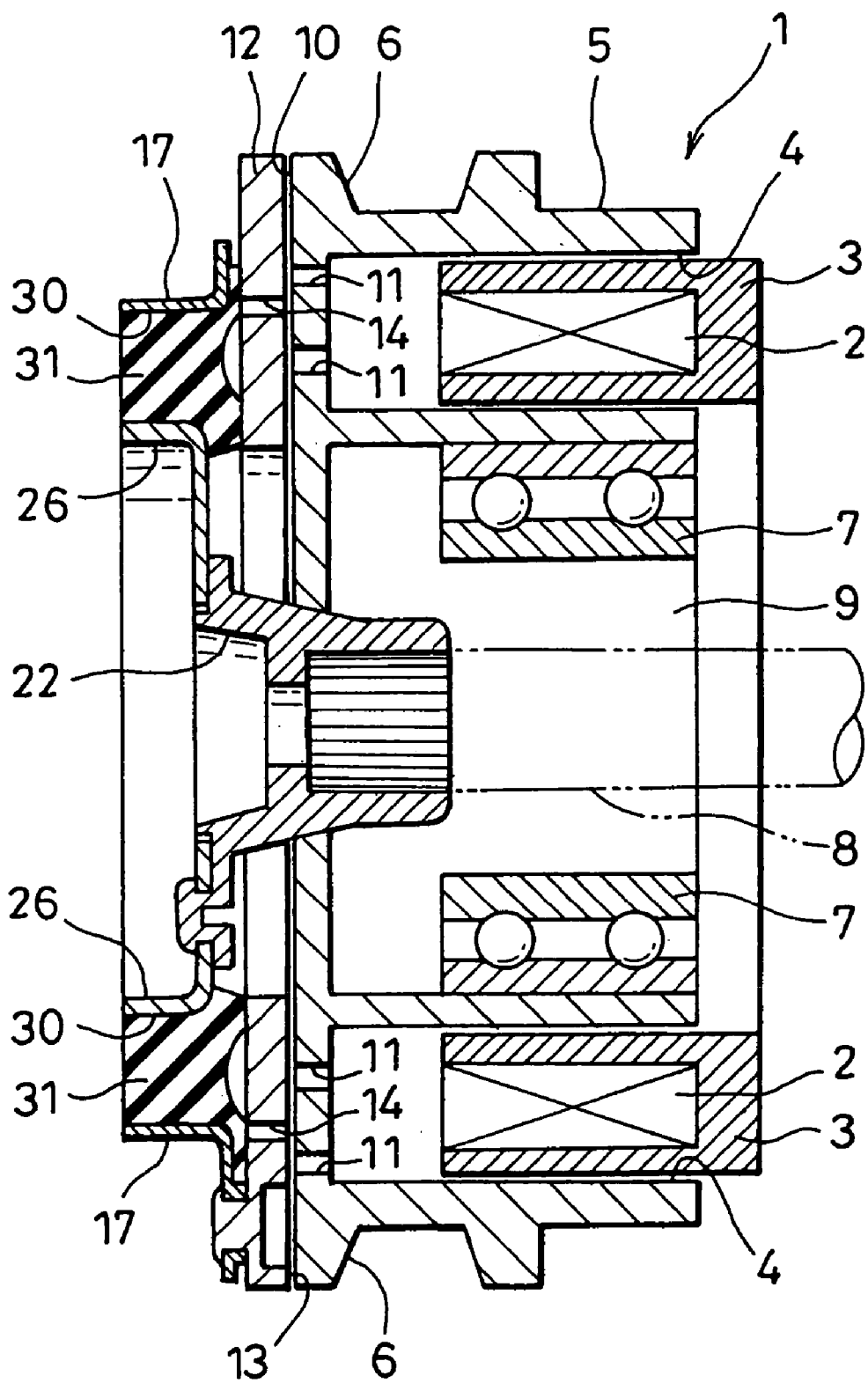
FIG. 1 is a schematic sectional view of the overall structure adopted in an electromagnetic clutch according to the present invention.

Reference numerals are used in the figures to indicate specific members as follows. Namely, reference numeral 1 indicates an electromagnetic clutch, reference numeral 2 indicates an exciting coil, reference numeral 5 indicates a rotor, reference numeral 10 indicates a rotor friction surface, reference numeral 12 indicates an armature plate, reference numeral 13 indicates an armature plate friction surface, reference numeral 16 indicates a projected part, reference numeral 17 indicates an outer plate, reference numeral 18 indicates a holding portion, reference numeral 19 indicates a flange, reference numeral 20 indicates a passing hole, reference numeral 21 indicates a projected part, reference numeral 22 indicates a hub, reference numeral 25 indicates a projected part, reference numeral 26 indicates an inner plate, reference numeral 27 indicates a base portion, reference numeral 28 indicates a holding portion, reference numeral 29 indicates a passing hole, reference numeral 30 indicates an annular gap, reference numeral 31 indicates an elastic member, reference numeral 32 indicates a projected part, reference numeral 32A indicates a surface and reference numeral 33 indicates a projected part.

BEST MODE FOR CARRYING OUT THE INVENTION

The following is an explanation of an embodiment of the present invention given in reference to the drawings.

An electromagnetic clutch 1 adopting the structure schematically illustrated in FIG. 1 is utilized to intermittently supply rotating motive power from a motive power source such as an engine or a motor to a slave device such as a compressor and comprises an exciting coil 2, a rotor 5 that rotates around the exciting coil 2, an armature plate 12 facing opposite the rotor 5 along the axial direction, a hub 22 which rotates as the armature plate 12 rotates, an outer plate 17 connected with the armature plate 12, an inner plate 26 connected with the hub 22 and an elastic member 31 which is held in an annular gap 30 formed as the outer plate 17 and the inner plate 26 are assembled together.

To explain the basic operation and the like of the electromagnetic clutch 1 adopting the structure described above, the resilience force of the elastic member 31 is applied to the armature plate 12 via the outer plate 17 so as to keep the armature plate 12 away from the rotor 5 and thus, the rotor 5 is in a state of idle running when no power is supplied to the exciting coil 2. As power is supplied to the exciting coil 2, a magnetomotive force is generated, thereby generating a magnetic flux at the rotor 5 and the armature plate 12, which causes the armature plate 12 to become attracted toward the rotor 5 against the resilience force of the elastic member 31 and ultimately causes the slave device to rotate via the outer plate 17, the elastic member 31 and the hub 22.

The exciting coil 2, which is wound around a bobbin (not shown) disposed inside a stator housing 3, can be locked to the main body-side housing of the slave device with a mounting plate (not shown). The stator housing 3 in which the exciting coil 2 is housed, in turn, is housed with a specific clearance inside an annular groove 4 formed at a side surface of the rotor 5 facing opposite the main body of the slave device.

The rotor 5 is rotatably fitted around a cylindrical member 9 assuming an annular shape, having a groove 6 formed at the external circumference thereof at which a connecting belt used to achieve a connection with the motive power source is mounted and axially supporting a drive shaft 8 of the slave device via a bearing 7 at the internal circumference thereof. The side surface of the rotor located on the opposite side from the main body of the slave device constitutes a flat friction surface 10 that is perpendicular to the axial center and facing opposite the armature plate 12 to be detailed below. Slits 11 through which the magnetic flux generated by supplying power to the exciting coil 2 is turned is formed at the friction surface 10.

Figure 3:
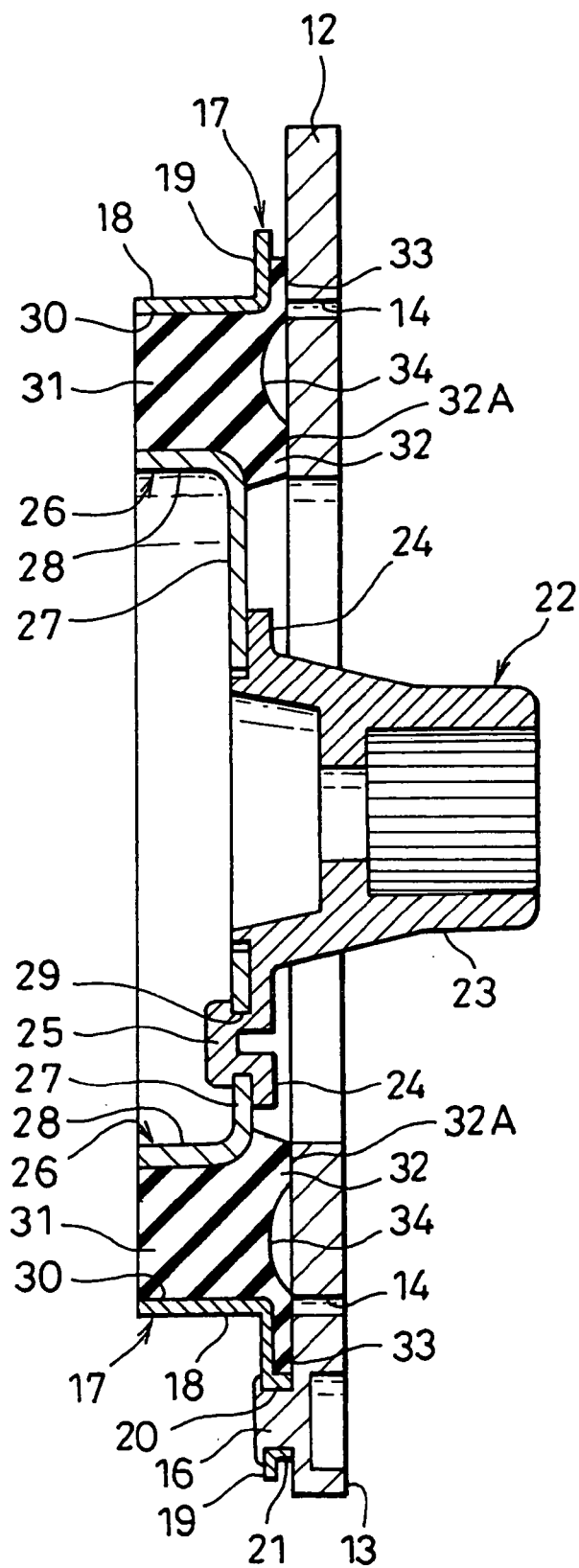
FIG. 3 is an enlarged sectional view of the essential portion of the assembly constituted with the outer plate, the inner plate and the elastic member in the electromagnetic clutch in FIG. 1, which is not yet mounted with the other members.

The armature plate 12 includes a flat friction surface 13 facing opposite the friction surface 10 at the rotor 5. Slits 14, which are also shown in FIG. 3, are formed at the friction surface 13 of the armature plate 12 so as to turn the magnetic flux generated by supplying power to the exciting coil 2, at a position offset from the position of the slits 11 formed at the friction surface 10 of the rotor 5. In this embodiment, the friction surface 13 at the armature plate 12 is galvanized over, for instance, a thickness of 8 micrometers. As a result, the transfer torque in the initial stationary state, which is 40 to 50 newtonmeters in the related art with a non-galvanized friction surface 13 at the armature plate 12 is improved by approximately 20%. The remaining surfaces of the armature plate 12, other than the friction surface 13, e.g., the surface that comes in contact with a projected part 32 of the elastic member 31 to be detailed later, are treated with a cationic coating for rust prevention in the embodiment.

Figure 2:
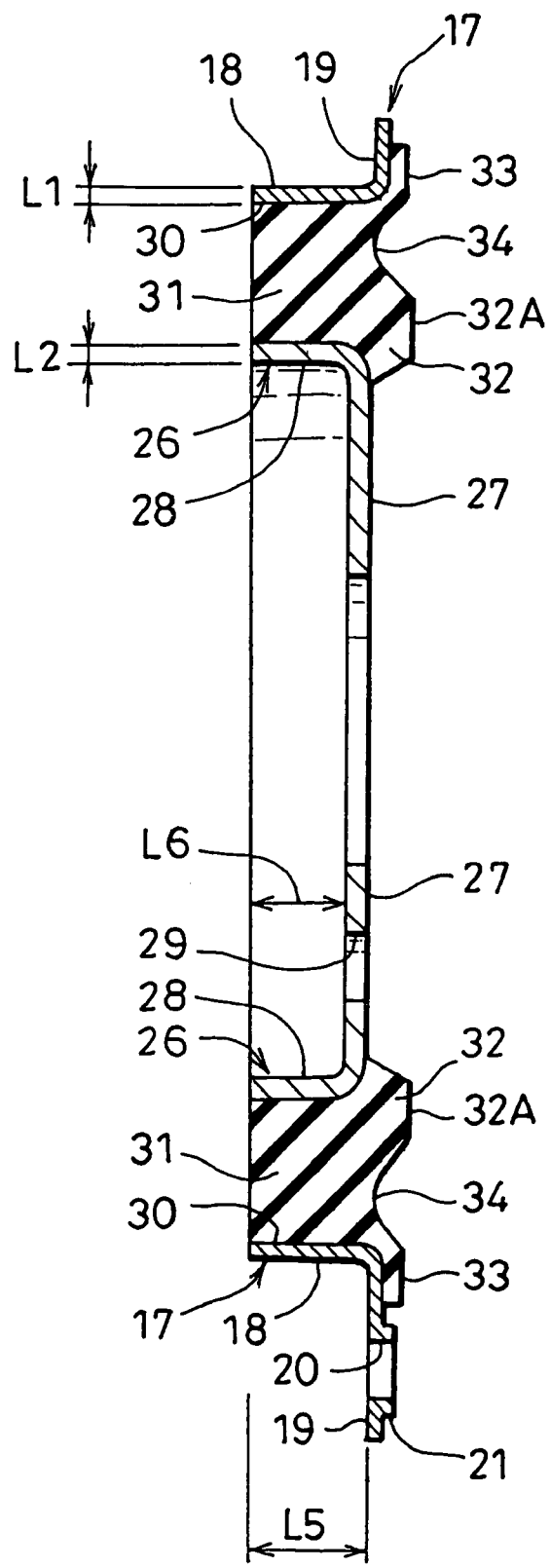
FIG. 2 is a sectional view of the structure adopted in an assembly constituted with the outer plate, the inner plate and the elastic member in the electromagnetic clutch in FIG. 1, which is not mounted with other members such as the armature plate.
Figure 5A:
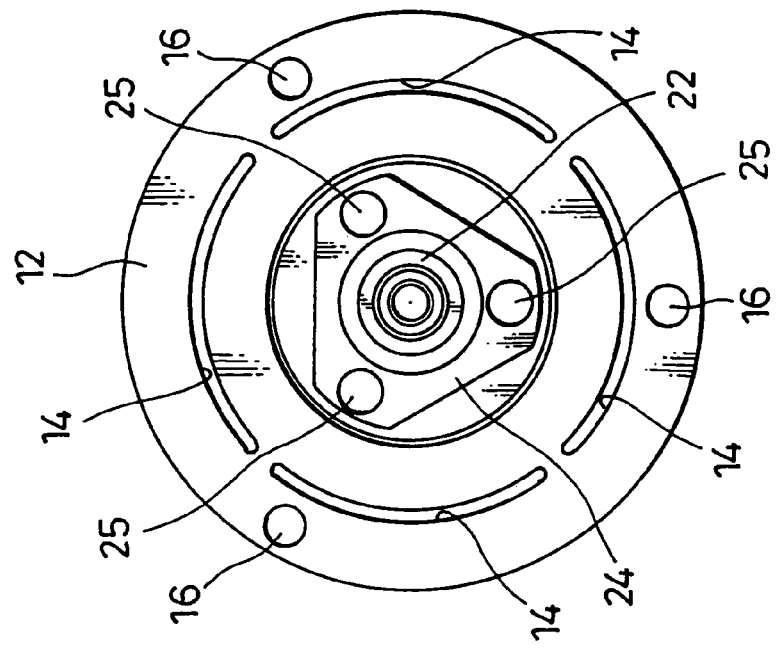
FIG. 5 illustrates a state in which the assembly constituted with the outer plate, the inner plate and the elastic member is mounted with the hub and the armature plate, with FIG. 5(a) showing the assembled state viewed from the side opposite from the rotor, FIG. 5(b) presenting a sectional view and FIG. 5(c) showing the assembled state viewed from the rotor side.
Figure 5B:
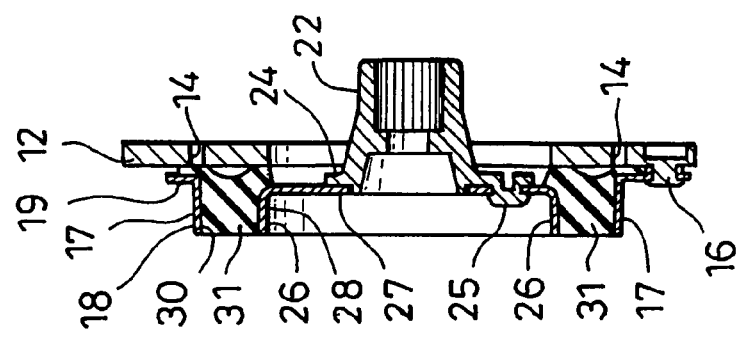
Figure 5C:
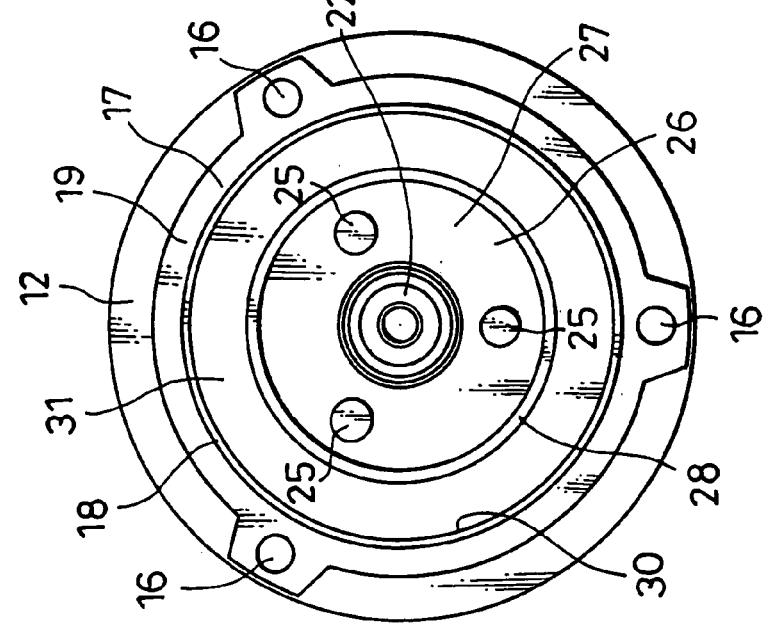

As shown in FIGS. 2, 3 and 5, the outer plate 17 is constituted with a tubular holding portion 18 used to hold the elastic member 31 and extending along the axial direction and a flange 19 extending outward from the end of the holding portion 18 facing toward the armature plate along the surface of the armature plate 12. The outer plate 17 is locked onto the armature plate 12 as particularly shown in FIG. 3, by inserting a projected part 16 projecting out from the armature plate 12 at a passing hole 20 formed at the flange 19 and then caulking the head of the projected part. Since this structure eliminates the need to use a rivet to lock the outer plate 17 to the armature plate 12, a cost reduction is achieved with a smaller number of required parts.

The hub 22 is locked onto an end of the drive shaft 8 with a bolt, and, as shown in FIG. 3, the inner plate 26 is connected at a flange 24 of the hub 22, which distends along the radial direction from a main body 23 of the hub 22 locked to the drive shaft 8. Namely, as illustrated in FIGS. 2 and 5, the inner plate 26 is formed as a separate element from the hub 22, having a substantially disk-shaped base portion 27 and a holding portion 28 rising in a substantially tubular shape from the outer edge of the base portion 27 along the axial direction. The inner plate 26 is connected with the hub 22 by first inserting a projected part 25 projecting out from the flange 24 of the hub 22 at a passing hole 29 formed at the base portion 27 and then caulking the head of the projected part 25, as shown in FIG. 3.

Since the hub 22 and the inner plate 26 are formed as elements independent of each other as described above, a single inner plate 26 can be used in conjunction with various types of devices with varying drive shaft diameters and varying positions assumed along the axial direction, which necessitates the use of different types of hubs 22, and as a result, a cost reduction is achieved. In addition, since the hub 22 and the inner plate 26 are locked to each other without using a rivet, a cost reduction is achieved with a smaller number of required parts. It is to be noted that the thickness L2 of the inner plate 26 should be preferably set larger than the thickness L1 of the outer plate 17, as shown in FIG. 2.

As shown in FIGS. 2, 3 and 5, the elastic member 31 to be detailed below is disposed in the annular gap 30 formed between the holding portions 18 and 27 as the outer plate 17 and the inner plate 26 are assembled together, and the outer plate 17 and the inner plate 26 are connected to each other via the elastic member 31 bonded to both the outer plate 17 and the inner plate 26.

As particularly shown in FIG. 5, the elastic member 31 assumes an annular shape ranging along the entire edges of the holding portion 18 at the outer plate 17 and the holding portion 28 at the inner plate 26. The elastic member 31 is provided to prevent damage to the drive shaft 8 and the like caused by a torque fluctuation by absorbing the torque fluctuation occurring along the rotating direction through torsion. The elastic member 31 is constituted of a rubber material such as NBR or chlorinated butyl, by ensuring that it can become deformed to such an extent that the volume of the deformed elastic member is approximately 82% to 88% of the volume of the elastic member when not deformed. Thus, more reliable torsion of the elastic member 31 is assured.

Figure 4:
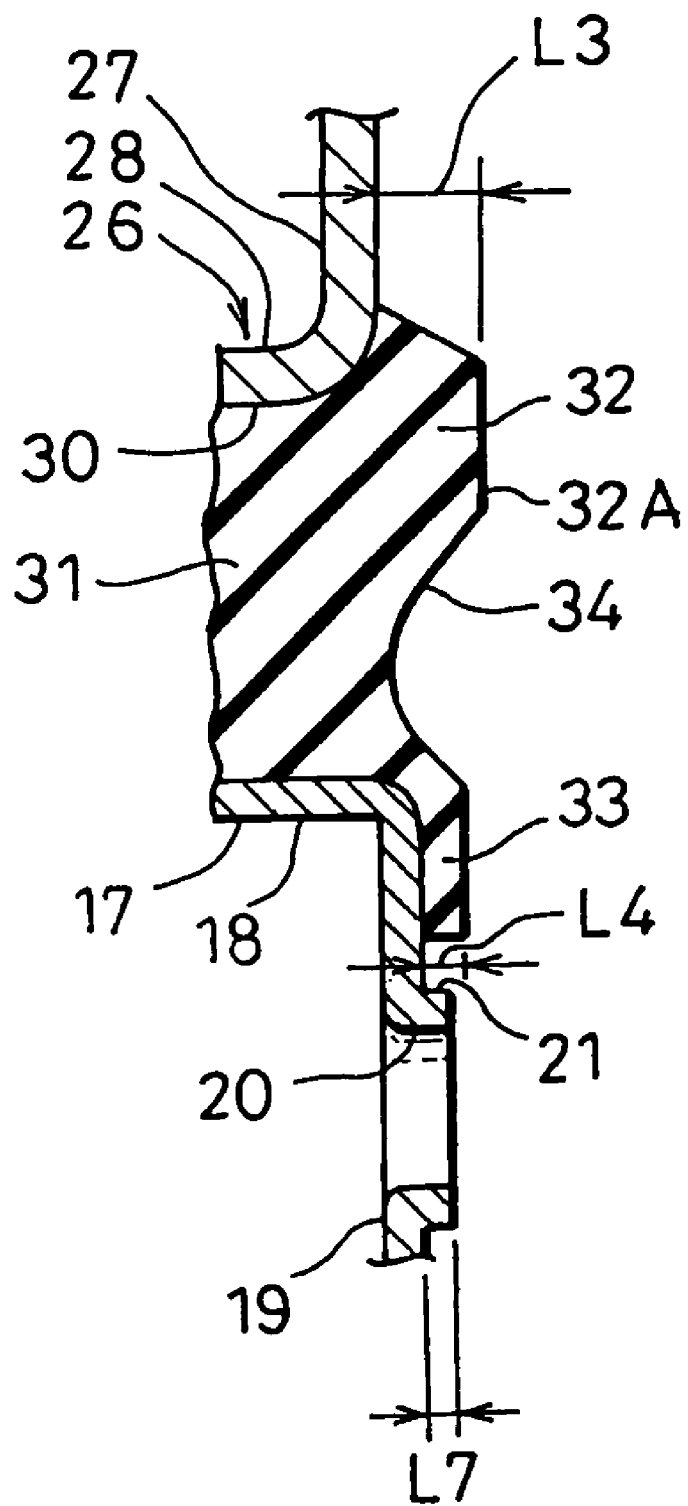
FIG. 4 is an enlarged view illustrating relative dimensional differences manifesting in an assembly constituted with the outer plate, the inner plate, the elastic member, the hub and the armature plate in the electromagnetic clutch.

As shown in FIGS. 2, 3 and 4, the elastic member 31 includes the projected part 32 formed at a position on the inner plate side, which is made to project out toward the armature plate 12 and achieves contact with the armature plate 12 when the armature plate 12 and the rotor 5 are at the most distant from each other (i.e., when no power is supplied). The elastic member 31 also includes a projected part 33 formed at a position on the outer plate side, which is made to project out toward the armature plate 12 and extends toward the outer edge along the radial direction to be held between the armature plate 12 and the outer plate 17. A surface 34 between the projected part 32 and the projected part 33 curves inward and thus forms a gap between the elastic member and the armature plate 12, as particularly shown in FIG. 3. As a result, the portion of the elastic member 31 that becomes deformed as the elastic member 31 is compressed is allowed to fill this gap and thus, the compression of the elastic member 31 along the axial direction is facilitated.

While an epoxy coating is applied over substantially the entire periphery of the elastic member 31 to prevent corrosion, a surface 32A of the projected part 32 which comes in contact with the armature plate 12 is masked during the epoxy coating application and thus remains free of the epoxy paint. For this reason, even though the cationic coating is applied onto the surface of the armature plate 12 facing toward the elastic member, as explained earlier, the surface 32A of the projected part 32 is not allowed to become stuck onto the surface of the armature plate 12 facing toward the elastic member when power is supplied.

As shown in FIG. 2, the measurement L5 of the holding portion 18 at the outer plate 17 taken along the axial direction is greater than the measurement L6 of the holding portion 28 at the inner plate 26 taken along the axial direction and, at the same time, the outer plate 17 and the inner plate 26 are assembled together so as to align the front end of the holding portion 18 with the front end of the holding portion 28, according to the present invention. Consequently, the surface of the base portion 27 facing toward the armature plate is set further away from the armature plate 12 compared to the surface of the flange 19 facing toward the armature plate, as shown in FIG. 3. Namely, the distance to the armature plate 12 from the surface of the base portion 27 facing toward the armature plate is relatively large compared to the distance in the structure in the related art in which the surface of the inner plate facing toward the armature plate and the surface of the outer plate facing toward the armature plate are aligned along the radial direction in an assembled state.

As shown in FIG. 4, the thickness L3 of the projected part 32 is set greater than the thickness L4 of the projected part 33 at the elastic member 31 in an uncompressed state, as shown in FIG. 4, so as to ensure that even when the surface of the base portion 27 facing toward the armature plate is further away from the armature plate 12 than the surface of the flange 19 facing toward the armature plate, the elastic member 31 remains held in a compressed state.

Thus, even when the elastic member 31 is held in a compressed state between the inner plate 26 and the armature plate 12, a relatively large thickness of the projected part 32 at the elastic member 31 compared to the thickness of the projected part of the elastic member on the inner plate side in the compressed state in the related art achieves a greater volume due to the greater distance to the armature plate 12 from the surface of the base portion 27 facing toward the armature plate compared to the corresponding distance in the related art.

As a result, the extent of the engagement noise occurring as the armature plate 12 becomes attracted to the rotor 5 is lowered. In addition, the increase in the volume of the projected part 32 of the elastic member 31 reduces the rates at which the projected part 32 of the elastic member 31 becomes buckled and deformed when the clutch is engaged and the armature plate 12 vibrates as a result. For this reason, the projected part 32 of the elastic member 31 does not become damaged readily.

Furthermore, as shown in FIGS. 2, 3 and 4, an annular projected part 21 is formed at the outer plate 17 so as to project out from the circumferential edge of the passing whole 20. This makes it possible to form the clearance in which the projected part 33 of the elastic member 31 is set between the flange 19 of the outer plate 17 and the armature plate 12 during the assembly process by abutting the top surface of the projected part 21 against the armature plate 12, as particularly shown in FIG. 3. In the embodiment, the measurement L7 by which the projected part 21 is made to project out (i.e., the measurement of the clearance between the flange 19 and the armature plate 12) is set smaller than the thickness L4 of the projected part 33 at the elastic member 31 in an uncompressed state, as shown in FIG. 4.

In the structure explained above, the projected part 33 of the elastic member 31 is held in a compressed state between the flange 19 of the outer plate 17 and the armature plate 12 and, as a result, the extent of the engagement noise occurring as the friction surface 13 of the armature plate 12 is attracted to the friction surface 10 of the rotor 5 can be reduced compared to the extent of the engagement noise occurring in a structure in which the measurement by which the projected part 21 is made to project out is substantially equal to the thickness of the projected part 33 at the elastic member 31 and the projected part 33 is held in a substantially uncompressed state or the projected part is simply in contact with the armature plate 12.

INDUSTRIAL APPLICABILITY

As explained above, according to the present invention disclosed in claim 1, a structure in which the surface of the inner plate facing toward the armature plate is further distanced from the armature plate than the surface of the outer plate facing toward the armature plate in an assembled state is achieved, and thus, the projected part formed at the elastic member on the inner plate side is allowed to project out by a greater measurement relative to that in a structure having the surface of the inner plate facing toward the armature plate and the surface of the outer plate facing toward the armature plate aligned along the radial direction in the assembled state. As a result, the volume of the projected part at the elastic member can be increased to lower the extent of the engagement noise occurring when the armature plate becomes attracted to the rotor.

In addition, the increase in the volume of the projected part of the elastic member reduces the rates at which the projected part of the elastic member becomes buckled and deformed when the clutch is engaged and the armature plate vibrates as a result, so as to prevent damage to the projected part of the elastic member.

According to the present invention disclosed in claim 2, the thickness of the first projected part of the elastic member held between the inner plate and the armature plate is set greater than the thickness of the second projected part of the elastic member held between the outer plate and the armature plate so as to increase the volume of the first projected part relative to the volume of the first projected part at the elastic member in the related art in which the thicknesses of the first projected part and the second projected part are set equal to each other and, as a result, the extent of the engagement noise occurring when the armature plate becomes attracted to the rotor can be reduced.

In addition, the increase in the volume of the first projected part of the elastic member reduces the rates at which the first projected part of the elastic member becomes buckled and deformed when the clutch is engaged and the armature plate vibrates as a result, so as to prevent damage to the first projected part of the elastic member.

According to the present invention disclosed in claim 3, the first projected part of the elastic member on the inner plate side is allowed to project out to a greater extent than the extent to which the first projected part is made to project out in a structure having the first projected part of the elastic member on the inner plate side and the second projected part of the elastic member on the outer plate side aligned along the radial direction in a compressed state, so as to increase the volume of the first projected part relative to the volume of the first projected part of the elastic member in the related art. Consequently, the extent of the engagement noise occurring when the armature plate becomes attracted to the rotor is lowered.

Furthermore, the increase in the volume of the first projected part of the elastic member reduces the rates at which the first projected part of the elastic member becomes buckled and deformed when the clutch is engaged and the armature plate vibrates as a result, so as to prevent damage to the first projected part of the elastic member.

According to the present invention disclosed in claim 4, the top of the projected part made to project out from the outer plate achieves contact with the armature plate and thus, no spacer member such as a washer is required to eliminate the gap between the outer plate and the armature plate, which, in turn, achieves a reduction in the production cost of the electromagnetic clutch with a smaller number of required parts.

According to the present invention disclosed in claim 5, the measurement by which the projected part of the outer plate is made to project out is set smaller than the measurement by which the second projected part at the elastic member is made to project out, so as to ensure that the second projected part of the elastic member is held between the armature plate and the outer plate in a compressed state and, consequently, the extent of the engagement noise occurring when the armature plate becomes attracted to the rotor can be further reduced compared to the extent of the engagement noise occurring in a structure in which the second projected part is held between the armature plate and the outer plate in an uncompressed state.

According to the present invention disclosed in claim 6, an improvement is achieved in the transfer torque in the initial stationary state by galvanizing the armature plate, over an electromagnetic clutch in the related art with a non-galvanized armature plate. As a result, the extent of the engagement noise occurring when the armature plate becomes attracted to the rotor is reduced.

According to the present invention disclosed in claim 7, the armature plate is connected with the outer plate at the projected part made to project out from the armature plate, so as to eliminate the need to use a fastening member such as a rivet to connect the armature plate to the outer plate, which leads to a reduction in the production cost of the electromagnetic clutch with a smaller number of required parts.

According to the present invention disclosed in claim 8, the hub is connected with the inner plate at the projected part made to project out from the hub, so as to eliminate the need to use a fastening member such as a rivet to connect the hub to the inner plate. This leads to a reduction in the production cost of the electromagnetic clutch with a smaller number of required parts.

According to the present invention disclosed in claim 9, even with the surface of the armature plate facing toward the elastic member treated with a cationic coating, the surface of the first projected part of the elastic member is not allowed to stick to the surface of the armature plate facing toward the elastic member and thus, the armature plate is allowed to be attracted toward the rotor with a high degree of reliability.

The invention claimed is:

1. An electromagnetic clutch comprising:
   an exciting coil;
   a rotor that is rotationally driven by a motive power source;
   an armature plate facing opposite said rotor along the axial direction, which is attracted to said rotor by an electromagnetic force generated as power is supplied to said exciting coil;
   a hub having an axial center matching the axial center of said armature plate;
   an outer plate connected to said armature plate;
   an inner plate connected to said hub; and
   an elastic member held at an annular gap formed as said outer plate and said inner plate are assembled together and bonded onto both said outer plate and said inner plate, characterized in:
   that a portion of said elastic member on the inner plate side includes a projected part made to project outward along the axial direction so as to achieve contact with said armature plate when no power is supplied, with a surface of said projected part, which achieves contact with said armature plate when no power is supplied, having no coating applied thereto;
   that holding portions of said outer plate and said inner plate used to hold said elastic member face opposite each other over said annular gap;
   that the measurement of said holding portion at said outer plate taken along the axial direction is greater compared to the measurement of said holding portion at said inner plate taken along the axial direction;
   and that said outer plate includes a passing hole at which a member used to fasten said outer plate to said armature plate is inserted and a projected part made to project from the circumferential edge of said passing hole toward said armature plate.

2. An electromagnetic clutch comprising:
   an exciting coil;
   a rotor that is rotationally driven by a motive power source;
   an armature plate facing opposite said rotor along the axial direction, which is attracted to said rotor by an electromagnetic force generated as power is supplied to said exciting coil;
   a hub having an axial center matching the axial center of said armature plate;
   an outer plate connected to said armature plate;
   an inner plate connected to said hub; and
   an elastic member held at an annular gap formed as said outer plate and said inner plate are assembled together and bonded onto both said outer plate and said inner plate, characterized in:
   that a portion of said elastic member on the inner plate side includes a first projected part made to project outward along the axial direction so as to achieve contact with said armature plate when no power is supplied, with a surface of said first projected part, which achieves contact with said armature plate when no power is supplied, having no coating applied thereto;
   that a portion of said elastic member on the outer plate side includes a second projected part which is made to project outward along the axial direction so as to achieve contact with said armature plate and is also made to distend outward along the radial direction so as to be held between said armature plate and said outer plate;
   that the thickness of said first projected part when it is held between said inner plate and said armature plate is greater than the thickness of said second projected part when it is held between said outer plate and said armature plate;
   and that said outer plate includes a passing hole at which a member used to fasten said outer plate to said armature plate is inserted and a projected part made to project from the circumferential edge of said passing hole toward said armature plate.

3. An electromagnetic clutch comprising:
   an exciting coil;
   a rotor that is rotationally driven by a motive power source;
   an armature plate facing opposite said rotor along the axial direction, which is attracted to said rotor by an electromagnetic force generated as power is supplied to said exciting coil;
   a hub having an axial center matching the axial center of said armature plate;
   an outer plate connected to said armature plate;
   an inner plate connected to said hub; and
   an elastic member held at an annular gap formed as said outer plate and said inner plate are assembled together and bonded onto both said outer plate and said inner plate, characterized in:
   that a portion of said elastic member on the inner plate side includes a first projected part which is made to project outward along the axial direction so as to achieve contact with said armature plate when no power is supplied;
   that a portion of said elastic member on the outer plate side includes a second projected part which is made to project outward along the axial direction so as to achieve contact with said armature plate and also made to distend outward along the radial direction so as to be held between said armature plate and said outer plate;
   that the thickness of said first projected part in an uncompressed state is greater than the thickness of said second projected part in an uncompressed state;
   and that said outer plate includes a passing hole at which a member used to fasten said outer plate to said armature plate is inserted and a projected part made to project from the circumferential edge of said passing hole toward said armature plate.

4. An electromagnetic clutch according to claim 1, characterized in:
   that the measurement by which said projected part of said outer plate is made to project out is set smaller than the measurement by which said second projected part of said elastic member is made to project out.

5. An electromagnetic clutch according to claim 2, characterized in:
   that the measurement by which said projected part of said outer plate is made to project out is set smaller than the measurement by which said second projected part of said elastic member is made to project out.

6. An electromagnetic clutch according to claim 3, characterized in:

that the measurement by which said projected part of said outer plate is made to project out is set smaller than the measurement by which said second projected part of said elastic member is made to project out.

* * * * *